(12) United States Patent
Von Brockdorff

(10) Patent No.: US 6,808,110 B1
(45) Date of Patent: Oct. 26, 2004

(54) CASHLESS PAYMENT BY MEANS OF A MOBILE RADIO APPARATUS

(75) Inventor: Christian-Friedrich Von Brockdorff, Icking (DE)

(73) Assignee: SIemens Aktiengesellschaft, Munich (DE)

(*) Notice: Subject to any disclaimer, the term of this patent is extended or adjusted under 35 U.S.C. 154(b) by 747 days.

(21) Appl. No.: 09/254,723
(22) PCT Filed: Aug. 22, 1997
(86) PCT No.: PCT/DE97/01824
§ 371 (c)(1),
(2), (4) Date: Mar. 11, 1999
(87) PCT Pub. No.: WO98/11519
PCT Pub. Date: Mar. 19, 1998

(30) Foreign Application Priority Data

Sep. 13, 1996 (DE) .......................... 196 37 434

(51) Int. Cl.$^7$ .............................................. G06K 5/00
(52) U.S. Cl. ..................................................... 235/380
(58) Field of Search ........................................ 235/380

(56) References Cited

U.S. PATENT DOCUMENTS 5,208,446 A 5/1993 Martinez

FOREIGN PATENT DOCUMENTS

| EP | 0 264 023 A2 | 4/1988 |
| EP | 0 708 547 A2 | 4/1996 |
| WO | WO 94/11849 | 5/1994 |
| WO | WO 96/13814 | 5/1996 |
| WO | WO 96/25828 | 8/1996 |

OTHER PUBLICATIONS

REE: Revue de L'Électricité et de L'Électroniqué, 1995 No. 4, C. Combanière, "Nouvelles possibilités de paiement", pp. 57–65.

Primary Examiner—Mark Tremblay
(74) Attorney, Agent, or Firm—Bell, Boyd & Lloyd LLC

(57) ABSTRACT

The method is for cashless payment, in which a call (V) is set up via the mobile radio network (MS) from the terminal (MF) with multifunctional chipcard (CK) to a business terminal (GE). A credit rating check is performed with a card number (KN) stored in the chipcard (CK). An amount of money entered at the business terminal (GE) is released for payment in the event of a positive result of the credit rating check after a confirmation at the terminal (MF).

3 Claims, 1 Drawing Sheet

CASHLESS PAYMENT BY MEANS OF A MOBILE RADIO APPARATUS

BACKGROUND OF THE INVENTION

The invention relates to a method for cashless payment.

Today, the cashless or paperless payment of amounts of money takes place by using a debit card and entering a personal identification number, for example in shops. Instead of inputting the personal identification number, debiting can also be carried out after signing a corresponding receipt after the electronic reading of the card data. Entering the personal identification number or the signature are used for the authentication of the customer and, at the same time, as confirmation of the accepted amount of money by the customer.

In the text which follows, a business is understood to be all points or terminals at which a customer can pay for goods, services or similar. The business is equipped for handling the payment by means of a business terminal, for example a cash terminal with connection to a credit card center for checking the credit rating of the customer.

To combine various services with one another, multifunctional chipcards can be introduced. Thus, for example, the Barclaycard can be used for conducting bank business and using a mobile station. A disadvantageous factor in this connection is that the card must be taken out of the mobile station for the bank business. This is relatively awkward and the customer cannot be reached from the radio mobile network during this period of time. Furthermore, so-called mini-cards, which are rather unsuitable for manual use, are used in some cases in mobile stations.

It is possible to exchange digital data via mobile radio systems or mobile radio networks, for example in accordance with the GSM Standard. These digital data can be digitized voice signals, data for fax communication or quite generally data for stationary or mobile data processing systems such as personal computers of notebooks.

SUMMARY OF THE INVENTION

The invention is based on the object of simplifying a method of the type initially mentioned by using a multifunctional chipcard.

In general terms the present invention is a method for cashless payment. A multifunctional chipcard is contacted in a terminal with a wireless connection to a mobile radio network. After a personal identification feature has been entered at the terminal, the latter is registered with the mobile radio network and booked into the latter. A call is set up via the mobile radio network from the terminal to a business terminal: A credit rating check is carried out with a card number stored in the chipcard. An amount of money entered at the business terminal is di splayed at the terminal via the call and released for payment in the event of a positive result of the credit rating check after a confirmation at the terminal.

Advantageous developments of the present invention are as follows.

Parameters (telephone number) necessary for setting up the call are transmitted by a transmitting device of the business terminal to a receiving device of the terminal.

A further identification feature is entered at the terminal for performing the credit rating check.

The method according to the invention has the following advantages for the customer. There is no extra card, debit card or credit card for payment. Similarly, there is no personal identification number for this extra card.

Furthermore, the manufacturer of the mobile stations does not need to take into consideration the format of the multifunctional chipcard since this card does not need to be taken out of the set.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single FIGURE depicts the method for cashless payment according to the present invention.

DESCRIPTION OF THE PREFERRED EMBODIMENTS

Figure 1:
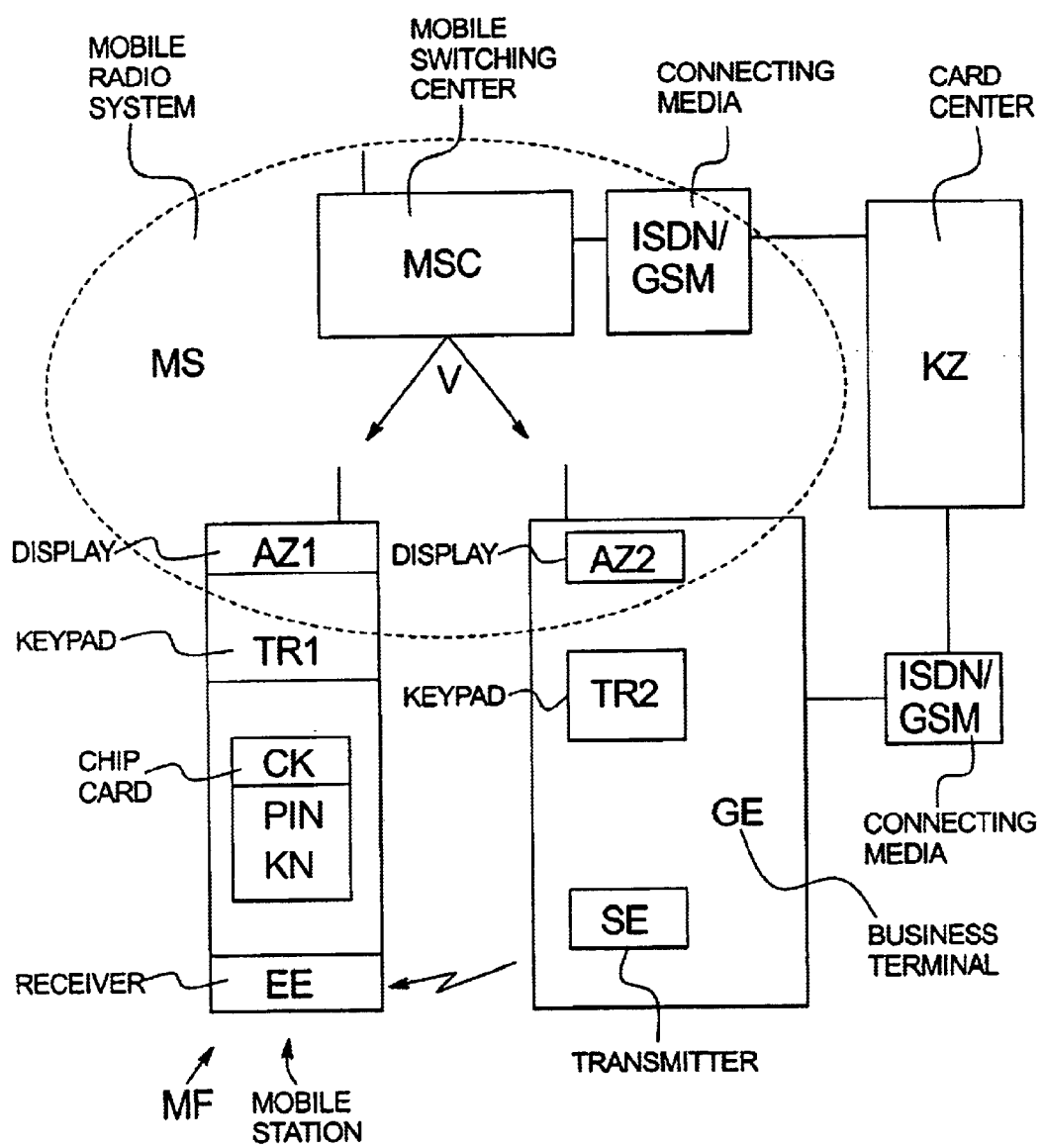

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

A mobile radio system MS has a mobile switching center MSC. The cellular structure of the mobile radio system MS and the associated base stations are of subordinate significance to the invention and are not shown in the FIGURE. The mobile radio system MS can be constructed in accordance with the GSM or DECT Standard and in accordance with another national or international radio system.

The cashless payment transactions are handled by means of a business terminal GE which is installed, for example, in a business, in a bank or independently. The business terminal GE can be an automatic teller machine or a bank terminal. The business terminal GE has a display device AZ2 and a keypad TR2.

To carry out the method according to the invention, a customer has a mobile station MF This mobile station MF has a display device AZ1 and a keypad TR1 in a manner known per se. A personal identification number PIN and a card number KN are stored on a multifunctional chipcard CK inserted in the mobile station MF. The identification number PIN must be entered by the user of the mobile station MF for registering with the mobile radio system MS. After the registration, that is to say when the correct identification number PIN has been entered, the mobile station MF is booked into the mobile radio system MS. In general, the identification number PIN is checked in the mobile station MP itself.

The mobile station HF sets up a call V via the mobile switching center MSC to the business terminal GE. For this purpose, the customer enters, for example the telephone number specified at the business terminal GE, via the keypad TR1 into his mobile station MF. This call V is a first step for processing the cashless payment transaction.

The mobile switching center MSC and/or the business terminal GE are connected to a card center KZ. The card center KZ is used for checking the credit rating of the customer or, respectively, of the chipcard CK used by him. The connection to the card center KZ can be implemented via an ISDN telephone line or via a GSM mobile radio network.

As the next step, the credit rating of the customer is checked in the card center KZ by means of the card number RN stored in the chipcard CK. The card number KN can be transmitted from the mobile switching center MSC to the card center XZ and the result of the credit rating check is subsequently automatically transmitted via the call V to the business terminal GE. The card number KN can also be transmitted to the card center by the business terminal GE, and the result of the credit rating check is then transmitted directly to the business terminal GE from the card center KZ.

At the business terminal GE, the amount of money to be paid is entered via the keypad TR2. This amount of money is transmitted via the call V to the mobile station MF and is displayed on the display device AZ1 there. The amount of money can also lead to a reservation in the card center KZ in the usual manner.

After the completed credit rating check with a positive result, the customer is requested to confirm the amount of money. In a further step for handling the cashless payment transaction, the customer enters a confirmation at his mobile station MF by operating one or more keys of the keypad TR1, which confirmation is transmitted to the business terminal GE via the call V. After this confirmation of the amount of money and, if necessary, the debiting in the card center KZ, the cashless payment transaction between the mobile station MF of the customer and the business terminal GE is completed.

In a variant of the invention, the call V is set up via the business terminal GE to the card center KZ, for example by using a mobile radio network according to the DECT Standard.

In a development of the invention, the mobile station MF has a receiving device EE and the business terminal GE has a transmitting device SE. The receiving device and transmitting device EE and, respectively, SE are preferably of wireless design. This wireless connection between the business terminal GE and the mobile station MF can be implemented, for example, by means of an infra-red transmission link and corresponding transmitting and receiving modules.

The transmitting device SE can radiate the telephone number of the business terminal GE. The customer does not then need to enter this telephone number at the mobile station MF but this received telephone number can be used for setting up the call V in the mobile radio system MS in simplified manner, for example by mere confirmation.

The personal identification number PIN is used for authenticating the customer with respect to the chipcard. The credit rating via the card number KN is used for checking the creditworthiness of the customer. In one embodiment of the invention, the input of a further identification number can be provided for carrying out the actual payment, for example before the confirmation of the requested amount of money.

Instead of the personal or further identification number PIN, other identification features of the customer, for example his fingerprint or his voice, can also be used in future.

Instead of the mobile station MF, the customer can use quite generally a terminal having a wireless connection with a mobile radio system MS. Such a terminal can be, for example, a Personal Intelligence Communicator (PIC) or a Personal Digital Assistant (PDA). Data processing devices having a radio interface are also suitable for carrying out the method according to the invention.

What is claimed is:

1. A method for cashless payment, comprising the steps of:

establishing communication from a multifunctional chipcard in a user terminal via a wireless connection to a mobile radio network;

entering a personal identification feature at the user terminal;

registering the user terminal with the mobile radio network and booking the user terminal into the mobile radio network:

setting up a call via the mobile radio network from the user terminal to a business terminal;

carrying out a credit rating check with a card number stored in the chipcard;

displaying an amount of money entered at the business terminal at the user terminal via the call; and releasing the amount of money for payment if a positive result of the credit rating check occurs after a confirmation at the user terminal.

2. The method as claimed in claim 1, wherein parameters for setting up the call are transmitted by a transmitting device in the business terminal to a receiving device in the user terminal.

3. The method as claimed in claim 1, wherein a further identification feature is entered at the user terminal for performing the credit rating check.

* * * * *